Oct. 31, 1944.    R. W. POINTER    2,361,496
SUSPENSION FOR MULTIWHEEL VEHICLES
Filed Sept. 23, 1941
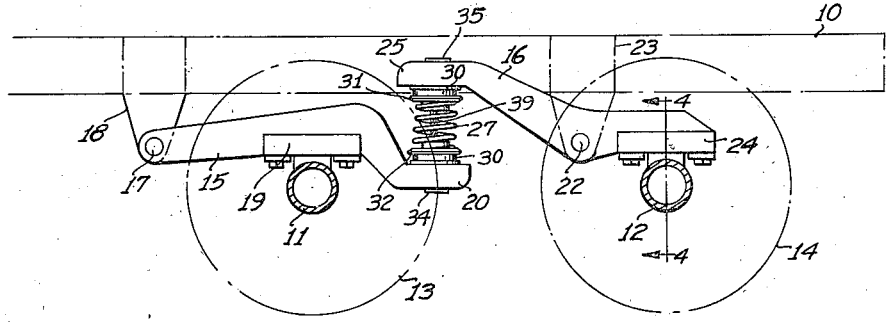
Fig. 1
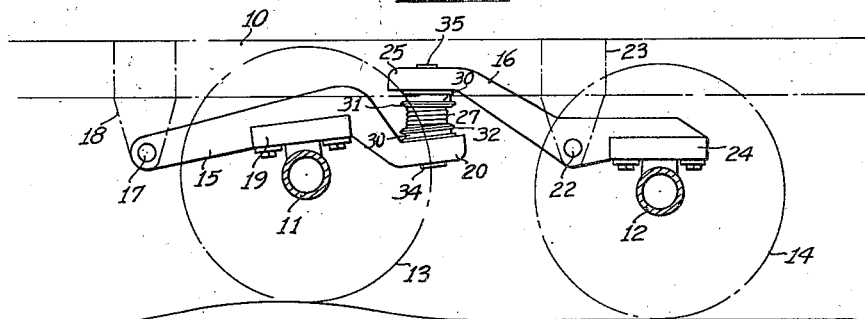
Fig. 2
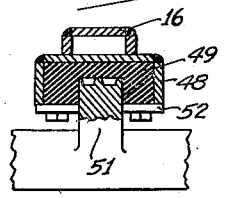
Fig. 6
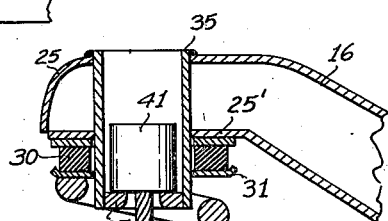
Fig. 4
Fig. 3
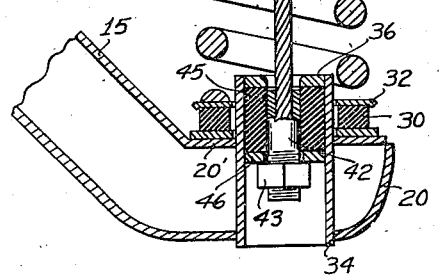
Fig. 5
ROBERT W. POINTER
INVENTOR.
BY
ATTORNEY Patented Oct. 31, 1944

2,361,496

UNITED STATES PATENT OFFICE 2,361,496

SUSPENSION FOR MULTIWHEEL VEHICLES

Robert William Pointer, Portland, Oreg.

Application September 23, 1941, Serial No. 411,953

6 Claims. (Cl. 267—20)

The present invention relates to motor vehicles, and more particularly to suspension structures for tandem axles therefor.

In order to distribute the vehicle load over a large bearing surface of the roadway, a multiplicity of wheels are provided on the vehicle, frequently mounted on tandem axles arranged at one or both ends of the vehicle frame. The tandem axles of each pair usually are connected to the frame in such manner that the load and road shocks are properly divided between the axles. It has been a common practice heretofore in providing suspensions for tandem axles to employ leaf spring beams, metal links and shackles, which are inherently rather expensive and which are otherwise generally undesirable in that they permit lateral shifting of the axles tending to produce drag on the tires. Moreover, the rigid link and shackle connections between the spring beams and the vehicle frame do not adequately compensate for tilting movements of the axle and, as a result, the spring beams are caused to twist about their longitudinal axes, causing destructive stresses to be set up therein. It has been proposed to provide swivel connections between such beams and the frame but such connections are usually relatively complicated, difficult to maintain, and do not permit proper tracking of the various pairs of wheels. It is desirable, therefore, to produce a simplified suspension which will embody a minimum number of spring parts and which will provide the requisite flexibility, and, at the same time, effect a proper distribution of load between the tandem axles.

Accordingly, it is an object of the invention to provide a new and improved suspension structure for tandem axles of multi-wheel road vehicles which includes a simplified arrangement of pivoted rigid beams and resilient connections therebetween, which structure effectively distributes the vehicle load between the axles and provides adequate cushioning of road shocks, the structure comprising a relatively few parts and being of low cost manufacture.

It is a further object of the invention to provide a new and simplified resilient connection between rigid suspension beams of tandem axle vehicles, which structure effectively equalizes the stresses of load and road shocks between the axles without subjecting either the axles, beams or vehicle frame members to destructive strains.

These and other objects and advantages are accomplished by the present invention, the illustrated form of which comprises a pair of rigid beams which are pivotally attached to the vehicle frame for movement only in a vertical plane. The beams are each further attached at a point spaced from the frame connection by a resilient mounting device to respective of the tandem axles. The beams have overlying end portions and are so arranged as regards their pivotal points that the overlying end portions of the beams are normally biased toward each other by the vehicle load. A compression element is arranged between adjacent end portions of the beams whereby road shocks of either axle are effectively absorbed and a uniform distribution of load maintained therebetween. Means are also provided loosely connecting the adjacent ends of the beams for positively limiting the amount of separation thereof without interfering with the cushioning effect of the compression element or the equalization of vehicle load.

Further objects and advantages of the invention will become apparent from a study of the following detailed description taken in connection with the accompanying drawing, while the features of novelty will be pointed out with greater particularity in the claims annexed to and forming a part of the specification.

In the drawing, Figure 1 is a side elevation showing a road vehicle supported upon tandem axles by a resilient suspension according to the present invention; Figure 2 is a view of the structure of Figure 1 shown in a second condition of operation; Figure 3 is an enlarged sectional view showing in greater detail the resilient connection between the overlying adjacent ends of the suspension beams; Figure 4 is a cross sectional view taken along the line 4—4 of Figure 1, showing in greater detail the resilient axle mounting; Figure 5 is an enlarged sectional view illustrating a resilient connection between the overlying ends of the suspension beams according to a modification of the invention; and Figure 6 is a fragmentary view illustrating a resilient connection between overlying ends of suspension beams and embodying a second modification of the invention.

Referring now to the drawing, the numeral 10 indicates a vehicle frame beneath one end of which is arranged a pair of tandem axles 11 and 12 having wheels mounted thereon, as indicated by the broken lines 13 and 14, respectively. The vehicle frame 10 is supported upon the tandem axles 11 and 12 by a suspension structure at each side thereof, each suspension comprising a pair of beams 15 and 16. The first beam 15 is pivoted at its forward end as at 17 to an offset bracket 18 depending from the frame 10. The beam 15 is attached intermediate its ends by a cushion mount 19 to the first axle 11, while the outer beam extremity 20 extends somewhat therebeyond. The second beam 16 is pivotally connected as at 22 to an offset bracket 23 depending downwardly from the frame 10, the rear end of the beam being attached by the cushion mount 24 to the second axle 12. The forward end 25 of beam 16 overlies the rear extremity 20 of the first beam 15, the two adjacent end portions being offset in the vertical plane from the main beam portions so that in the normal position the two end portions are spaced apart. The pivotal connections of the beams to the respective brackets permit pivotal movement of the beams only in a common vertical plane or in closely adjacent parallel planes.

It will be observed that with the beams 15 and 16 pivotally connected to the side frame member and attached to the axles as shown, the adjacent end portions 20 and 25 of the two beams are normally biased toward each other by the weight of the vehicle. A resilient compression element, such as a coil spring 27, is arranged between the adjacent beam ends maintaining them in a spaced relation. As shown in greater detail in the sectional view of Figure 3, opposed seating surfaces 20' and 25' are provided on the ends of the beams 20 and 25, respectively, for the spring 27. In the preferred form, similar cushion seats, formed by annular members 30 of a suitable resilient material such as rubber, and metal washers 31 and 32, are provided between the opposite ends of the coil spring 27 and the surfaces 20' and 25', respectively.

The overlying adjacent ends 20 and 25 of beams 15 and 16, respectively, are loosely connected together by a suitable means for positively limiting the amount of separation which may occur therebetween upon rebound. In the particular arrangement shown, aligned passages are provided in the ends of the beams and which may be formed by tubular members 34 and 35, suitably secured as by welding in cooperating apertures provided through the ends of the beams 15 and 16, respectively. Annular shoulders are provided in the adjacent ends of the tubular members 34 and 35 which may be formed by rings 36 and 37 welded in place. The loose connection between the two ends of the beams is formed, in this instance, by a length of flexible cable 39, to the upper end of which is secured an enlarged ferrule 41 arranged within the tubular member 35 and to the lower end of which is secured a ferrule 42 threaded on its outer end for cooperatively receiving a nut 43. The upper ferrule 41 is of a diameter somewhat smaller than the inner diameter of the tubular member 35 so as to be freely slidable therein, and is adapted to engage cooperatively with the inner surface of the shoulder forming ring 37, while the cable 39 extends through the aperture through the latter ring. The ferrule 42 has an outer diameter such that it may be inserted through the aperture in the ring 36 welded to the upper end of the tubular member 34 and extends through an annular cushion ring 45 of a suitable resilient material such as rubber which is arranged within the tubular member 34. A metal washer 46 is provided under the nut 43 and forms a suitable seat for the lower end of the annular cushion 45, the nut 43 and washer 46 forming a stop on the lower end of the connection cable 39 for cooperating with the stop 36 through the resilient cushion 45.

The tubular members 34 and 35 extend beyond the beam surfaces 20' and 25' toward each other for retaining in place the annular cushion seats 30, metal washers 32 and the opposite ends of the coil spring 27.

The cushion mounts 19 and 24 between the beams 15 and 16 and axles 11 and 12, respectively, may be of any suitable type and freely permit relative tilting movements of the axles in passing over road obstructions without imparting any twisting stresses to the beam members. The particular details of these mounts form no part of the present invention, such devices being well known in the art, a preferred form, however, being shown in my prior Patent No. 2,238,002, issued April 8, 1941, for Cushion seat for trailer axles. The essential detail of a mount as described in the above patent is shown diagrammatically in Figure 4, and comprises an inverted box-like housing 48 formed integrally with the lower side of each beam member and which is adapted cooperatively to receive a cushion member 49 of a suitable resilient material such as rubber. A post 51 suitably secured to the axle extends upwardly within the cushion member 49, while both the post and member 49 are retained within the box 48 by plates 52.

In Figure 5 is illustrated a modification of the invention in which the compression element between the adjacent beam ends consists of a cylindrical block 53 of resilient material such as rubber in lieu of the coil spring 27. The block 53 is provided with metal washers 54 and 55 at the opposite ends thereof and which washers are provided with central depressions for cooperatively fitting over the rims of the extensions of tubular members 34 and 35 to retain the block in centered position upon the beam ends. The flexible tying means is the same in this instance as in the preceding modification, the block 53 being provided with a central longitudinal passage 56 for cooperatively receiving the cable 39 therethrough.

It will be obvious to those skilled in the art that the loose connection between the beam ends may be effected in various ways. A further modification of a suitable tying means is illustrated in Figure 6 which comprises a conventional shock absorber 58 which may suitably be secured to the upper beam 16 and having a link 59 pivotally connected to the extremity of the lower beam 15.

With the suspension arrangement as described, it will be obvious that the vehicle load will be distributed equally between the tandem axles in a greatly simplified manner without the usual equalizing or compensating lever arrangement. The strains of road shocks imposed upon either of the wheels 13 or 14 will be transmitted substantially instantaneously to both axles through the compression spring connection between the beams 15 and 16, which further acts to cushion the force of the shock. Only one spring, therefore, is required for each suspension, and thus only two for the tandem axles. The beams, in pivoting upon their respective pivotal connections with the frame, will cause their respective ends 20 and 25 to move through arcs rather than in a straight line relation toward each other, and, by the provision of the flexible cable 39 in the tying connection, such relative arcuate movements of the beam ends may take place freely without the imposition of any destructive stresses either upon the connection or upon the suspension beams.

In passing over irregularities in the roadway surface, which condition is illustrated in Figure 2, any one of the wheels is free to move vertically in accordance with the obstruction independently of the remaining wheels, while the distribution of the load therebetween remains substantially unaffected. By the provision of the resilient cushion members 30 for the seats at the opposite ends of the resilient spring 27, direct metallic contact between the beam ends upon the compression of the coil spring 27 to its maximum limit is precluded. The spring 27, when compressed solid, forms a spacer to prevent direct metallic contact between members 34 and 35. The amount of separation permissible between the ends of the beams is positively limited by the flexible, loose connection therebetween, while the resilient cushion 45 minimizes the shock at the outer limit of movement in the direction of separation.

Having described the principles of the invention in what is considered to be a preferred embodiment thereof, I desire to have it understood that the specific details shown are merely illustrative, and that the invention may be carried out in other ways.

I claim:

1. A multi-wheel road vehicle comprising a frame, a pair of adjacent axles disposed beneath said frame, a suspension at each side of said frame for supporting the latter upon said axles, each suspension comprising a pair of beams, the first of said beams pivotally connected at one end to said frame and attached intermediate its ends to the first of said axles, the second of said beams pivotally connected intermediate its ends to said frame and attached at one end to the second of said axles, said pivotal connections between said beams and said frame permitting pivotal movements of said beams in a vertical plane, resilient mountings attaching said beams to respective of said axles, the free end of said first beam being spaced vertically adjacent the free end of said second beam, a compression element arranged between said adjacent ends of said beams, and means loosely connecting said adjacent free ends of said beams for positively limiting the amount of separation therebetween.

2. A multi-wheel road vehicle comprising a frame, a pair of axles disposed under said frame, a supporting structure at each side of said frame for mounting the latter upon said axles, each structure comprising a pair of lever arms, the first of said arms being pivotally attached at one end to said frame and attached intermediate its ends to a first of said axles, the second of said lever arms being pivotally attached to said frame and having one end disposed vertically spaced adjacent the end of said first arm opposite the pivotal end thereof, the other end of said second arm being attached to the second of said axles, a compression element arranged between the vertically spaced ends of said lever arms, aligned longitudinal guideways in the adjacent ends of said lever arms, means slidably arranged in said guideways, cooperating stops in said guideways and on said means for positively limiting the extent of separation of said adjacent ends of said lever arms, said means flexibly connecting said lever arms so as to permit relative arcuate movement therebetween.

3. A multi-wheel road vehicle comprising a frame, tandem axles disposed beneath said frame, a suspension at each side of said frame for supporting the latter upon said axles, each suspension comprising a pair of beams, said beams being pivotally connected to said frame for movement in a common vertical plane, said beams being each attached to corresponding of said axles whereby the weight of said frame tends to rotate said beams in opposite directions, resilient mountings attaching said beams to respective ones of said axles, said beams having vertically spaced overlapping ends, a compression element arranged between said overlapping ends of said beams, and flexible means losely connecting said overlapping ends of said beams for positively limiting the amount of separation thereof upon rebound.

4. A multi-wheel road vehicle comprising a frame, tandem axles disposed under one end of said frame, a suspension at each side of said frame for supporting the latter upon said axles, each suspension comprising a pair of beams, said beams being each pivotally attached to said frame at spaced points and having adjacent overlapping ends, said beams being resiliently mounted on corresponding of said axles in such a manner that the load of said vehicle tends to force said overlapping beam ends toward each other, a resilient means arranged between said overlapping beam ends tending to keep them separated, and flexible means loosely connecting said overlapping beam ends for checking the rebound of said beam ends.

5. A multi-wheel road vehicle comprising a frame, tandem wheel shafts, a suspension at each side of said frame for supporting the latter upon said shafts, each suspension comprising a pair of rigid beams pivotally attached at longitudinally spaced points to said frame, said beams being each resiliently attached to corresponding of said shafts, said beams having vertically spaced overlying ends movable in opposite directions in response to a force acting vertically of said shafts, a resilient element operatively arranged between said ends to restrict the relative movement of said beam ends under the influence of said force, and relatively flexible means loosely connecting said beam ends to check the rebound thereof following the initial relative movement.

6. A multi-wheel road vehicle comprising a frame, tandem wheels disposed at one end of said frame, a suspension at each side of said frame for supporting the latter upon said axles, each suspension comprising a beam individual to each axle, a first of said beams pivotally connected at one end to said frame and attached intermediate its ends to one of said axles, a second of said beams pivotally connected intermediate its ends to said frame and attached at one end to the other of said axles, the opposite end of said second beam disposed above the adjacent end of said first beam, said beams being mounted for pivotal movements in a vertical plane, a compression element arranged between the adjacent ends of said beams, means defining passages in the adjacent ends of said beams, a loose connection between said beam ends comprising a cable arranged within said passages, a ferrule on one end of said cable for loosely engaging in one of said passages, and a take-up means on the opposite end of said cable engaging in the other of said passages for adjusting the effective length of said cable and limiting the amount of separation of said beam ends.

ROBERT WILLIAM POINTER.